(12) United States Patent
Gibbon et al.

(10) Patent No.: US 11,012,675 B2
(45) Date of Patent: May 18, 2021

(54) AUTOMATIC SELECTION OF VIEWPOINT CHARACTERISTICS AND TRAJECTORIES IN VOLUMETRIC VIDEO PRESENTATIONS

(71) Applicant: AT&T Intellectual Property I, L.P., Atlanta, GA (US)

(72) Inventors: David Crawford Gibbon, Lincroft, NJ (US); Tan Xu, Bridgewater, NJ (US); Zhu Liu, Marlboro, NJ (US); Behzad Shahraray, Holmdel, NJ (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 114 days.

(21) Appl. No.: 16/385,387

(22) Filed: Apr. 16, 2019

(65) Prior Publication Data

US 2020/0336722 A1 Oct. 22, 2020

(51) Int. Cl.
*H04N 13/156* (2018.01)
*H04N 13/117* (2018.01)
*G11B 27/034* (2006.01)
*H04N 21/218* (2011.01)
*H04N 13/133* (2018.01)

(52) U.S. Cl.
CPC ......... *H04N 13/117* (2018.05); *G11B 27/034* (2013.01); *H04N 13/133* (2018.05); *H04N 21/21805* (2013.01)

(58) Field of Classification Search
None
See application file for complete search history.

(56) References Cited

U.S. PATENT DOCUMENTS 5,850,352 A 12/1998 Moezzi et al.
7,448,063 B2 11/2008 Freeman et al.
(Continued)

FOREIGN PATENT DOCUMENTS

JP 2016099941 A 5/2016
WO 2007124664 A1 11/2007
(Continued)

OTHER PUBLICATIONS

Stancil, Brian A., Cha Zhang, and Tsuhan Chen. "Active multicamera networks: From rendering to surveillance." IEEE Journal of selected topics in signal processing 2.4 (2008): 597-605. http://chenlab.ece.cornell.edu/Publication/Brian/stancil_DPVN2008.pdf.
(Continued)

*Primary Examiner* — Eileen M Adams (57) ABSTRACT

A method for automatic selection of viewpoint characteristics and trajectories in volumetric video presentations includes receiving a plurality of video streams depicting a scene, wherein the plurality of video streams provides images of the scene from a plurality of different viewpoints, identifying a set of desired viewpoint characteristics for a volumetric video traversal of the scene, determining a trajectory through the plurality of video streams that is consistent with the set of desired viewpoint characteristics, rendering a volumetric video traversal that follows the trajectory, wherein the rendering comprises compositing the plurality of video streams, and publishing the volumetric video traversal for viewing on a user endpoint device.

20 Claims, 3 Drawing Sheets

(56) References Cited

U.S. PATENT DOCUMENTS

| | | |
|---|---|---|
| 7,593,602 B2 | 9/2009 | Stentiford |
| 7,778,445 B2 | 8/2010 | Au et al. |
| 7,830,381 B2 | 11/2010 | Lundström et al. |
| 7,944,454 B2 | 5/2011 | Zhou et al. |
| 8,009,864 B2 | 8/2011 | Linaker et al. |
| 8,477,154 B2 | 7/2013 | Davis et al. |
| 8,477,998 B1 | 7/2013 | Kim et al. |
| 8,488,877 B1 | 7/2013 | Owechko et al. |
| 8,705,876 B2 | 4/2014 | Vaddadi et al. |
| 8,755,610 B2 | 6/2014 | Holland et al. |
| 8,964,008 B2 | 2/2015 | Bathiche |
| 9,064,309 B2 | 6/2015 | Chaudhury et al. |
| 9,153,073 B2 | 10/2015 | Langlotz et al. |
| 9,185,361 B2 | 11/2015 | Curry |
| 9,196,021 B2 | 11/2015 | Jin et al. |
| 9,214,030 B2 | 12/2015 | Sole et al. |
| 9,258,531 B2 | 2/2016 | Jia et al. |
| 9,361,727 B2 | 6/2016 | Fuchs et al. |
| 9,363,569 B1 | 6/2016 | Van Hoff et al. |
| 9,406,131 B2 | 8/2016 | Würmlin et al. |
| 9,449,230 B2 | 9/2016 | Han et al. |
| 9,495,764 B1 | 11/2016 | Boardman et al. |
| 9,591,336 B2 | 3/2017 | Cronin et al. |
| 9,794,495 B1 | 10/2017 | Forsblom |
| 9,836,885 B1 | 12/2017 | Eraker et al. |
| 9,918,110 B2 | 3/2018 | Anwar et al. |
| 9,922,404 B2 | 3/2018 | Lee et al. |
| 9,940,898 B2 | 4/2018 | Cook et al. |
| 9,947,108 B1 | 4/2018 | Chen |
| 9,973,711 B2 | 5/2018 | Yang et al. |
| 9,986,221 B2 | 5/2018 | Zhou |
| 10,127,643 B2 | 11/2018 | Lee et al. |
| 2003/0023974 A1 | 1/2003 | Dagtas et al. |
| 2008/0246759 A1 | 10/2008 | Summers |
| 2011/0249090 A1* | 10/2011 | Moore ............... G06T 19/006 348/43 |
| 2015/0104065 A1 | 4/2015 | Park et al. |
| 2015/0226828 A1 | 8/2015 | Davies et al. |
| 2016/0191893 A1* | 6/2016 | Gewickey ........... H04N 13/388 386/223 |
| 2016/0198140 A1 | 7/2016 | Nadler |
| 2016/0335748 A1 | 11/2016 | Newson et al. |
| 2017/0061686 A1 | 3/2017 | Yu |
| 2017/0180680 A1 | 6/2017 | Yu |
| 2017/0195561 A1 | 7/2017 | Hegelich et al. |
| 2017/0236549 A1* | 8/2017 | Dittmer-Roche .... G11B 27/031 386/241 |
| 2017/0244948 A1 | 8/2017 | Pang et al. |
| 2017/0244985 A1 | 8/2017 | Masterson |
| 2017/0318275 A1 | 11/2017 | Khalid et al. |
| 2017/0339341 A1 | 11/2017 | Zhou et al. |
| 2018/0063514 A1 | 3/2018 | Mizuno |
| 2018/0098131 A1 | 4/2018 | Zhou |
| 2018/0131907 A1 | 5/2018 | Schmirler et al. |
| 2018/0146216 A1 | 5/2018 | Chang et al. |
| 2018/0164593 A1 | 6/2018 | Van der Auwera et al. |
| 2018/0173957 A1 | 6/2018 | Pavetic et al. |
| 2018/0213202 A1 | 7/2018 | Kopeinigg et al. |
| 2018/0220048 A1 | 8/2018 | Tamir et al. |
| 2018/0253884 A1 | 9/2018 | Burnett, III et al. |
| 2018/0255332 A1 | 9/2018 | Heusser |
| 2018/0302602 A1 | 10/2018 | Chen et al. |
| 2018/0332218 A1 | 11/2018 | Yoshimura |
| 2018/0342043 A1 | 11/2018 | Vandrotti et al. |
| 2018/0342106 A1 | 11/2018 | Rosado |
| 2018/0343387 A1 | 11/2018 | Bostick et al. |
| 2018/0350146 A1 | 12/2018 | Gervasio et al. |
| 2018/0359489 A1 | 12/2018 | Lakshman et al. |
| 2018/0376217 A1 | 12/2018 | Kahng et al. |
| 2019/0012844 A1 | 1/2019 | Rao et al. |
| 2019/0051037 A1 | 2/2019 | Chui et al. |
| 2019/0107845 A1* | 4/2019 | Kaine ................. G05D 1/0022 |
| 2019/0200058 A1* | 6/2019 | Hall ................... H04N 21/4122 |

FOREIGN PATENT DOCUMENTS

| | | |
|---|---|---|
| WO | 2016029224 A1 | 2/2016 |
| WO | 2017186649 A1 | 11/2017 |
| WO | 2017201751 A1 | 11/2017 |
| WO | 2017205642 A1 | 11/2017 |
| WO | 2018036456 A1 | 3/2018 |
| WO | 2018039646 A1 | 3/2018 |
| WO | 2018055340 A1 | 3/2018 |
| WO | 201810338 A1 | 6/2018 |
| WO | 2018144315 A1 | 8/2018 |
| WO | 2018175855 A1 | 9/2018 |

OTHER PUBLICATIONS

Ballan, Luca, et al. "Unstructured video-based rendering: Interactive exploration of casually captured videos." ACM Transactions on Graphics (TOG). vol. 29. No. 4. ACM, 2010. ftp://ftp.idc.ac.il/Faculty/arik/Seminar2010/papers/VideoDepictions/videoExploration.pdf.

Narayanan, P. J., Peter W. Rander, and Takeo Kanade. "Constructing virtual worlds using dense stereo." IEEE, 1998. https://www.researchgate.net/profile/Peter_Rander/publication/3766361_Constructing_virtual_worlds_using_dense_stereo/links/55fa9fb808ae07629e0417dc/Constructing-virtual-worlds-using-dense-stereo.pdf.

Possegger, Horst, et al., "Robust real-time tracking of multiple objects by volumetric mass densities," Proceedings of the IEEE Conference on Computer Vision and Pattern Recognition. 2013. http://citeseerx.ist.psu.edu/viewdoc/download?doi=10.1.1.648.3459&rep=rep1&type=pdf.

Rematas, Konstantinos, et al., "Soccer on Your Tabletop," Proceedings of the IEEE Conference on Computer Vision and Pattern Recognition. 2018. http://grail.cs.washington.edu/projects/soccer/.

Landabaso, Josée Luis, and Montse Pardás, "Foreground regions extraction and characterization towards real-time object tracking," International Workshop on Machine Learning for Multimodal Interaction. Springer, Berlin, Heidelberg, 2005. http://landabaso.org/publications/mlmi-05-landabaso.pdf.

Shih, Huang-Chia, "A Survey of Content-Aware Video Analysis for Sports," IEEE Transactions on Circuits and Systems for Video Technology 28.5 (2018): 1212-1231. https://ieeexplore.ieee.org/stamp/stamp.jsp?arnumber=7827117.

"Nokia, AT&T and Jaunt Showcase 5G and Immersive Experiences," Telecom Review, telecomreviewna.com, Nov. 29, 2018. https://web.archive.org/web/20190203205836/http://www.telecomreviewna.com/index.php?option=com_content&view=article&id=2485:nokia-atat-and-jaunt-showcase-5g-and-immersive-experiences&catid=3:newsflash&Itemid=131.

"Immersive sports analysis," Viz Libero, vizrt.com, Feb. 3, 2019. https://web.archive.org/web/20190203205957/https://www.vizrt.com/products/viz-libero/.

Gupta, Abhinav, et al. "Estimating spatial layout of rooms using volumetric reasoning about objects and surfaces." Advances in neural information processing systems, 2010. http://papers.nips.cc/paper/4120-estimating-spatial-layout-of-rooms-using-volumetric-reasoning-about-objects-and-surfaces.pdf.

Jia, Yun-Tao, Shi-Min Hu, and Ralph R. Martin. "Video completion using tracking and fragment merging." The Visual Computer 21.8-10 (2005): 601-610. http://citeseerx.ist.psu.edu/viewdoc/download?doi=10.1.1.166.30&rep=rep1&type=pdf.

Cai, Haoye, et al. "Deep video generation, prediction and completion of human action sequences." Proceedings of the European Conference on Computer Vision (ECCV). 2018. http://openaccess.thecvf.com/content_ECCV_2018/papers/Chunyan_Bai_Deep_Video_Generation_ECCV_2018_paper.pdf.

Patwardhan, Kedar A., Guillermo Sapiro, and Marcelo Bertalmio. "Video inpainting of occluding and occluded objects." IEEE International Conference on Image Processing 2005. vol. 2. IEEE, 2005. https://www.researchgate.net/profile/Kedar_Palwardhan2/publication/6534338_Video_Inpainting_Under_Constrained_Camera_Motion/links/0c96051e0323d67580000000/Video-Inpainting-Under-Constrained-Camera-Motion.pdf.

(56) References Cited

OTHER PUBLICATIONS

Zhang, Yunjun, Jiangjian Xiao, and Mubarak Shah. "Motion layer based object removal in videos." 2005 Seventh IEEE Workshops on Applications of Computer Vision (WACV/MOTION'05)—vol. 1. vol. 1 IEEE, 2005. http://citeseerx.ist.psu.edu/viewdoc/download?doi=10.1.1.75.7244&rep=rep1&type=pdf.

Kang, Kai, et al. "Object detection from video tubelets with convolutional neural networks." Proceedings of the IEEE conference on computer vision and pattern recognition. 2016. http://openaccess.thecvf.com/content_cvpr_2016/papers/Kang_Object_Detection_From_CVPR_2016_paper.pdf.

\* cited by examiner

AUTOMATIC SELECTION OF VIEWPOINT CHARACTERISTICS AND TRAJECTORIES IN VOLUMETRIC VIDEO PRESENTATIONS

The present disclosure relates generally to video technology, and relates more particularly to systems, non-transitory computer-readable media, and methods for automatic selection of viewpoint characteristics and trajectories in volumetric video presentations.

BACKGROUND

Volumetric video uses a plurality of cameras with depth sensors to capture a three-dimensional field of view of a scene from different viewpoints. The captured three-dimensional data may then be merged to obtain the entire scene. Unlike traditional 360 degree video (which projects the scene on a three-dimensional sphere), volumetric video records truly three-dimensional content and allows a viewer six degrees of freedom when viewing a scene. That is, the viewer may change her position (e.g., X, Z, Y coordinates) and viewing orientation (e.g., roll, yaw, pitch) to view the scene from any angle (including the middle of the scene). When viewing through a video player or similar device, the viewer can change her position through intuitive interactions such as orbit (i.e., rotating around the Y axis), zoom (i.e., moving along the Z axis, closer to or further from the origin), and pan (i.e., moving the viewpoint along the X or Y axis). The scene may also be viewed in two or three dimensions (e.g., using traditional two-dimensional television displays, three dimensional television displays, head mounted displays, and the like). As such, volumetric video techniques may be used to make the viewing experience highly immersive, interactive, and expressive.

SUMMARY

The present disclosure describes a device, computer-readable medium, and method for automatic selection of viewpoint characteristics and trajectories in volumetric video presentations. In one example, a method for automatic selection of viewpoint characteristics and trajectories in volumetric video presentations includes receiving a plurality of video streams depicting a scene, wherein the plurality of video streams provides images of the scene from a plurality of different viewpoints, identifying a set of desired viewpoint characteristics for a volumetric video traversal of the scene, determining a trajectory through the plurality of video streams that is consistent with the set of desired viewpoint characteristics, rendering a volumetric video traversal that follows the trajectory, wherein the rendering comprises compositing the plurality of video streams, and publishing the volumetric video traversal for viewing on a user endpoint device.

In another example, a non-transitory computer-readable storage medium stores instructions which, when executed by a processor, cause the processor to perform operations. The operations include receiving a plurality of video streams depicting a scene, wherein the plurality of video streams provides images of the scene from a plurality of different viewpoints, identifying a set of desired viewpoint characteristics for a volumetric video traversal of the scene, determining a trajectory through the plurality of video streams that is consistent with the set of desired viewpoint characteristics, rendering a volumetric video traversal that follows the trajectory, wherein the rendering comprises compositing the plurality of video streams, and publishing the volumetric video traversal for viewing on a user endpoint device In another example, a system includes a processor deployed in a telecommunication service provider network and a non-transitory computer-readable storage medium stores instructions which, when executed by the processor, cause the processor to perform operations. The operations include receiving a plurality of video streams depicting a scene, wherein the plurality of video streams provides images of the scene from a plurality of different viewpoints, identifying a set of desired viewpoint characteristics for a volumetric video traversal of the scene, determining a trajectory through the plurality of video streams that is consistent with the set of desired viewpoint characteristics, rendering a volumetric video traversal that follows the trajectory, wherein the rendering comprises compositing the plurality of video streams, and publishing the volumetric video traversal for viewing on a user endpoint device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides systems, non-transitory computer-readable media, and methods for automatic selection of viewpoint characteristics and trajectories in volumetric video presentations. As discussed above, volumetric video techniques may be used to enhance the viewing experience of visual media and events, such as movies, television shows, video games, extended reality applications (e.g., training exercises), and sporting events, by making the experience more immersive.

Volumetric video as a format tends to be very data-heavy, both in terms of raw data and in its finished form. The raw data may include, for example, multiple unedited video streams provided by multiple different cameras placed around a scene. The data in the finished form may include multiple different traversals (or sequences of viewpoints) that are created by compositing the video streams. Because the volumetric video format tends to be so data heavy, problems relating more generally to combining multiple views are amplified. For instance, the problem of viewpoint selection (e.g., which traversals to render for potential viewers) may be amplified by the fact that many volumetric video applications render at least two versions of each traversal: a first, two-dimensional video version (or "projection") which may be viewed on traditional, non 360-degree displays; and a second, volumetric video version comprising a continuous three-dimensional camera path which is viewable on specialized (e.g., 360 degree) displays.

Examples of the present disclosure automatically determine a set of viewpoint characteristics, such as focal length, distance from camera to target, and the like, for a volumetric video traversal of a scene. For instance, examples of the present disclosure may use post-capture and/or real-time filtering of a volumetric video viewpoint to create a smoother traversal (e.g., by compensating for poor video capture and/or obstructions), to adjust the lighting of the traversal, to focus on or track specific targets (e.g., individuals, objects, locations, or actions of interest, which may be user-defined) through the traversal, or to perform other operations that may alter the artistic and/or stylistic qualities of the traversal. In one particular example, specific artistic styles may be learned (e.g., from historical examples), and the artistic and/or stylistic qualities of the traversal may be adjusted to mimic the qualities of these specific artistic styles. For instance, the sound, mise-en-scene, cinematography, editing, and/or attitude of a traversal may be adjusted to mimic the style of a specific genre (e.g., documentary, film noir, arthouse, etc.), a specific group of filmmakers (e.g., Italian Neorealism, French new Wave, etc.), or a specific director. With respect to editing, an edit decision list (EDL) can be defined for volumetric video that includes, in addition to timing information (e.g., for in-point and out-of-point of the video segments), information about the viewing point (e.g., X, Y, Z coordinates), viewing direction, and/or the trajectory and speed with which the viewing point moves.

Thus, examples of the present disclosure greatly simplify the process of rendering two- and three-dimensional traversals from raw volumetric video data. New and interesting viewpoints may be automatically identified and selected for rendering. Moreover, the ability to create multiple traversals of the same content, where each traversal may mimic a different artistic style, allows for greater viewer personalization. For instance, one viewer may choose to view a film noir style rendering of the content, while another viewer may choose to view a documentary style rendering of the same content.

Within the context of the present disclosure, a "viewpoint" in a volumetric video may comprise a specific combination of viewing angle, degree of magnification (i.e., zoom), and/or perspective. Furthermore, the physical environment or space that is depicted in the volumetric video may be represented in the volumetric video as a plurality of "voxels" having positional coordinates (e.g., X, Y, Z with respect to a reference point), color information (e.g., red, green, blue values and/or cyan, magenta, yellow values), transparency information (e.g., zero to 100 percent), shading information, texture information, and so forth. In one example, the set of information values for respective voxels may change from one frame of the volumetric video to the next, e.g., as objects move through the physical environment(s), as lighting or other environmental conditions change, and so forth.

Figure 1:
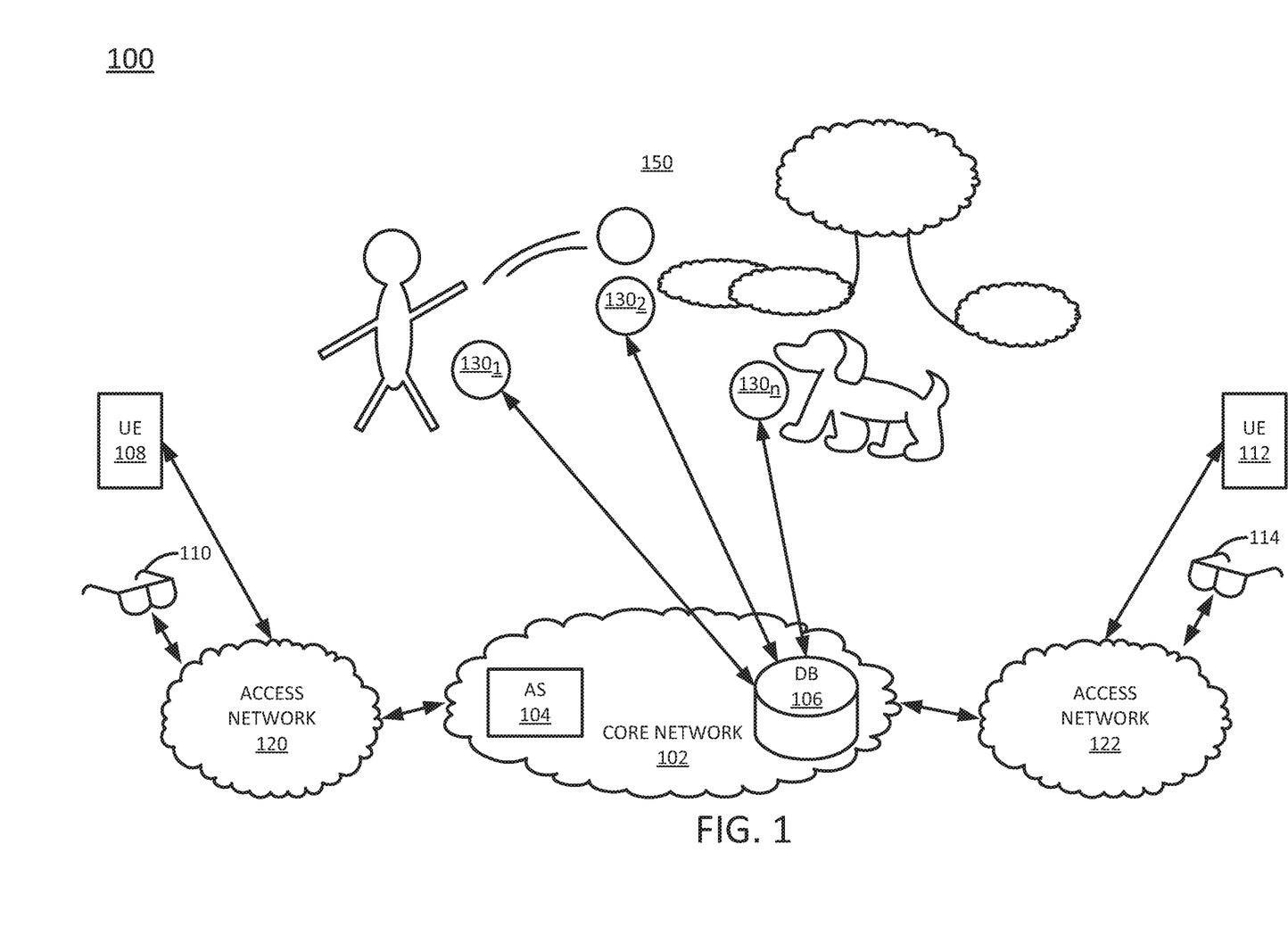
FIG. 1 illustrates an example system in which examples of the present disclosure for automatic selection of viewpoint characteristics and trajectories in volumetric video presentations may operate.

To further aid in understanding the present disclosure, FIG. 1 illustrates an example system 100 in which examples of the present disclosure for automatic selection of viewpoint characteristics and trajectories in volumetric video presentations may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server, an interactive TV/video on demand (VoD) server, and so forth.

Figure 3:
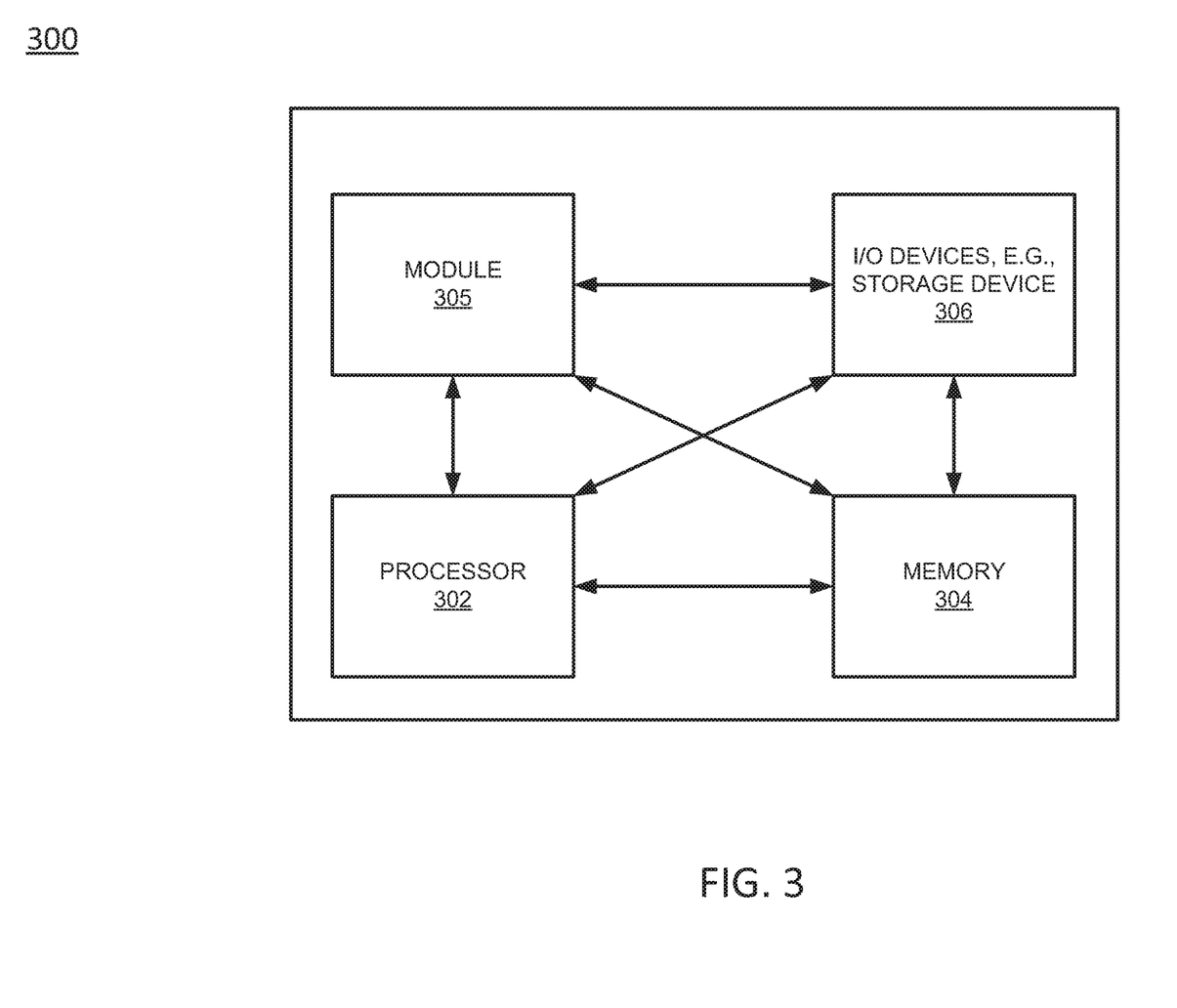
FIG. 3 depicts a high-level block diagram of a computing device specifically programmed to perform the functions described herein.

In accordance with the present disclosure, application server (AS) 104 may comprise a computing system or server, such as computing system 300 depicted in FIG. 3, and may be configured to provide one or more operations or functions for automatic selection of viewpoint characteristics and trajectories in volumetric video presentations, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

The AS 104 may be communicatively coupled to a database (DB) 106. The DB 106 may store data that is used by the AS 104 to perform operations or functions for automatic selection of viewpoint characteristics and trajectories in volumetric video presentations, as described herein. For instance, the DB 106 may store data including profiles of viewers (network users). The profiles may identify genres, cinematic styles, and/or directors that are of interest to the viewers. These genres, cinematic styles, and/or directors may include genres, cinematic styles, and/or directors that the viewers have viewed in connection with previous volumetric video presentations, or in connection with other (non-volumetric) video presentations. Each viewer may also explicitly identify (e.g., by selecting from a menu) genres, cinematic styles, and/or directors in which he or she is interested.

The DB 106 may also store information about different genres, cinematic styles, and/or directors. For instance, the DB 106 may store information regarding the sound, mise-en-scene, cinematography, editing, and/or attitude typically associated with different genres, cinematic styles, and/or directors. As an example, the DB 106 may specify a typical decibel level or degree of lighting associated with a given genre. For instance, an entry in the DB 106 for the film noir genre, which is typified by low-key lighting, shadows, and/or harsh lighting, may indicate that a small, intense light that emits at least 500 watts should be used to light a scene.

In a further example, the DB 106 may store a library of volumetric videos, a 2D video library, an image library, a plurality of 2D object detection/recognition models (e.g., machine learning-based image detection models), a catalog matching 2D objects to 3D object models, viewer preferences for prioritization of certain objects, topics, and/or regions of focus for rendering volumetric videos, and so forth that may be processed by AS 104 in connection with automatic selection of viewpoint characteristics and trajectories in volumetric video presentations. DB 106 may further store additional information such as a lexicon of topic models, e.g., machine learning-based models to identify topics and/or themes in 2D and/or volumetric video, and so forth.

In a further example, the DB 106 may store video streams that are generated by a plurality of video capture devices, e.g., two-dimensional and/or three-dimensional cameras, such as cameras $130_1$-$130n$ (hereinafter also referred to individually as a "camera 130" or collectively as "cameras 130"). The physical locations of cameras 130 may be geographically distributed throughout a scene 150. The scene 150 may be, for instance, a movie or television set, a sports venue, or any other location from which video may be captured. The scene 150 may also be a "virtual" scene, such as a computer-generated scene (e.g., as in the case of a video game). In this case, the cameras 130 may comprise a virtual camera system rather than a plurality of physical cameras. Although FIG. 1 illustrates three cameras 130, any number of cameras 130 may be distributed throughout the scene 150.

In one example, the positions of at least some of the cameras 130 within the scene 150 may be fixed. However, in other examples, at least some of the cameras 130 may be mounted to robots, unmanned aerial vehicles (UAVs), or other mechanisms that allow the cameras' positions to be adjusted dynamically. Each camera 130 may be positioned to capture a different perspective (e.g., a different orientation and/or viewpoint) within the scene 150. Some of these perspectives may overlap. Thus, in one example, the cameras 130 may be positioned to collectively provide a 360 degree view of the scene 150.

In addition, the settings of the cameras 130 may be adjusted to capture different viewpoint characteristics. For instance, the settings of different cameras may be adjusted to capture images having different magnitudes of zoom, movement, color, lighting, depth of field, and the like. Thus, the settings of one camera 130 may be adjusted to capture images of the scene 150 in a panoramic-style (e.g., zoomed out) view, with low lighting, while the settings of another camera may be adjusted to capture images of the scene 150 in a close-up (e.g., zoomed in) view, with much more intense lighting.

A volumetric video may then be composited from the videos obtained from the cameras 130. For instance, the AS 104 may retrieve the videos from the database and composite at least some of the videos to create a volumetric video traversal.

In a further example, AS 104 may comprise a physical storage device (e.g., a database server), to store various types of information in support of systems for automatic selection of viewpoint characteristics and trajectories in volumetric video presentations, in accordance with the present disclosure. For example, AS 104 may store any or all of the information stored by the DB 106. In a further example still, the AS 104 may acquire video streams directly from the cameras 130, rather than from the DB 106. For instance, the cameras 130 may stream video of a live event (e.g., a sporting event, a concert, or the like) directly to the AS 104, which may generate volumetric video traversals of the live event in real time (e.g., as the AS 104 receives the video streams, subject to any network latency).

Although only a single application server (AS) 104 and a single database (DB) 106 are illustrated in FIG. 1, it should be noted that any number of servers and databases may be deployed. For instance, a plurality of servers and databases may operate in a distributed and/or coordinated manner as a processing system to perform operations for selecting viewpoints for automatic selection of viewpoint characteristics and trajectories in volumetric video presentations, in accordance with the present disclosure. For ease of illustration, various additional elements of network 102 are omitted from FIG. 1.

As referred to herein, a machine learning model (MLM) (or machine learning-based model) may comprise a machine learning algorithm (MLA) that has been "trained" or configured in accordance with input data (e.g., training data) to perform a particular service, e.g., to predict or select viewpoint characteristics that may be of interest to viewers of volumetric video presentations. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in further communication with a plurality of user endpoint devices (UEs), such as devices 108 and 110. Similarly, access network 122 may be in further communication with a plurality of user endpoint devices (UEs), such as devices 112 and 114. In one example, UEs 108-114 may each comprise a mobile device, a cellular smart phone, a wearable computing device (e.g., smart glasses, augmented reality glasses, head mounted displays, or headsets), a digital camera, a web-camera, a home-based or business-based security camera, a remote controlled and/or automated drone (with one or more cameras), a personal computer (e.g., a laptop, a tablet computer, a desktop computer, etc.), a bank or cluster of such devices, and the like. In a further example, each of the UEs 108-114 includes or is communicatively coupled to a display that is capable of displaying volumetric video. For instance, UEs 110 and 114 specifically comprise head mounted displays of the type that may be used to view volumetric video presentations. In one example, UEs 108-114 may each comprise programs, logic or instructions for performing functions in connection with examples of the present disclosure for automatic selection of viewpoint characteristics and trajectories in volumetric video presentations. For example, devices 108-114 may each comprise a computing system or device, such as computing system 300 depicted in FIG. 3, and may be configured to provide one or more operations or functions in connection with examples of the present disclosure for automatic selection of viewpoint characteristics and trajectories in volumetric video presentations, as described herein.

In one example, the AS 104 may identify desired viewpoint characteristics for a traversal of a volumetric video presentation. The desired viewpoint characteristics may be specified by a viewer of the volumetric video presentation (e.g., via an explicit request related to a specific volumetric video presentation, or via stored preferences, profiles, or viewing history). For instance, where the volumetric video presentation depicts a film, the viewer may wish to view the film in a romantic comedy style format. Alternatively, the viewer may have viewed similar volumetric video presentations in the past in a romantic comedy style format, or may simply watch a lot of (non-volumetric video) romantic comedies. The AS 104 may also learn or predict viewpoint characteristics, for example through analysis of other materials that are thematically similar to the volumetric video presentation, such as movies, television shows, sporting events, and even user-generated content. Prediction of viewpoint characteristics can also be based on viewer demographics (e.g., what other viewers in a common age range prefer to view), popular viewpoint characteristics (e.g., most requested viewpoint characteristics or most followed traversals), or other means. Prediction of viewpoint characteristics may employ the use of machine learning techniques or models to learn potential viewpoint characteristics based on the historical viewership or popularity of previous viewpoint characteristics.

The AS 104 may select and/or edit videos obtained from the cameras 130 based on a selected set of viewpoint characteristics and may generate a composite of the videos in the form of a traversal (e.g., a continuous sequence of viewpoints) through the volumetric video that is consistent with the viewpoint characteristics. For instance, if the AS 104 is to render a film noir style traversal, the AS 104 may examine the available videos for videos that exhibit qualities consistent with the film noir style (e.g., low-key lighting, shadows, and/or harsh lighting) or for videos that can be edited to exhibit qualities consistent with the film noir style. The selected videos may then be composited to render the volumetric video traversal.

A plurality of different traversals may be generated by the AS 104 in a similar manner for a plurality of different viewpoint characteristics. Once the traversals are established, a viewer, e.g., via one of the UEs 108-114, may then obtain a presentation of the volumetric video from AS 104 that follows one of the traversals. The viewer may also "jump" from one traversal to another, different traversal at any time while viewing the volumetric video presentation.

For instance, AS 104 may create a two or three dimensional output video, e.g., a projection/traversal of the three dimensional space of the volumetric video, and stream or otherwise transmit the output video to the UEs 108-114. Alternatively, or in addition, the volumetric video may be provided to the UEs 108-114, and the UEs 108-114 may render the volumetric video in accordance with the display capabilities of the UEs 108-114. In addition, in a server-based example, the AS 104 may also store the output video that is created. Similarly, the AS 104 may provide the volumetric video and/or traversal of the 3D space of the volumetric video to an endpoint device (not shown) for controlling one or more of the cameras 130. In one example, these traversal switches could be controlled explicitly from user feedback collected at the UEs 108-114 (e.g., touch feedback, voice commands, interactive selections, etc.). In another example, these traversal switches may be performed by the system, based on machine-learned (or manually specified) user profiles that indicate preferences for viewpoint characteristics or traversal styles.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within the scene 150. Thus, these and other modifications are all contemplated within the scope of the present disclosure.

Figure 2:
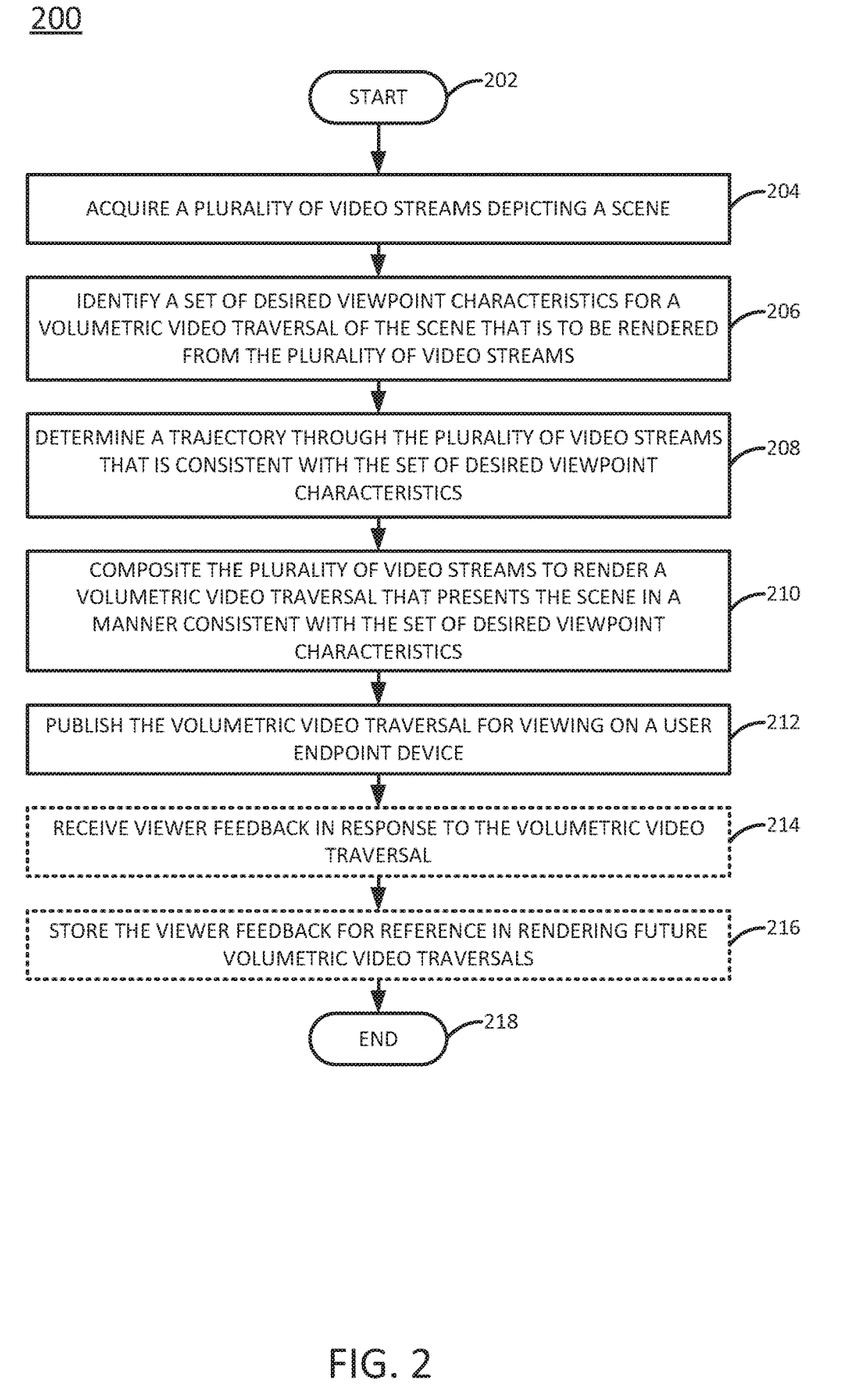
FIG. 2 illustrates a flowchart of an example method for automatic selection of viewpoint characteristics and trajectories in volumetric video presentations.

FIG. 2 illustrates a flowchart of an example method 200 for automatic selection of viewpoint characteristics and trajectories in volumetric video presentations. In one example, the method 200 may be used to select viewpoint characteristics of volumetric video presentations when network conditions are stable (e.g., the measured latency does not vary with higher than a threshold standard deviation, where the threshold standard deviation may be, for instance, thirty milliseconds). The steps, functions, or operations of the method 200 may be performed, for example, by the AS 104 and/or one or the wearable UEs 110 or 114 illustrated in FIG. 1. For instance, if a wearable display device has a sufficiently powerful processor, the wearable display device may perform all steps of the method 200. Alternatively, to conserve processing power, the wearable display device may offload some of the more processing intensive steps of the method 200 to a remote application server.

In another example, the steps, functions, or operations of method 200 may be performed by a computing device or system 300, and/or processor 302 as described in connection with FIG. 3 below. Similarly, in one example, the steps, functions, and/or operations of the method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processor, such as processor 302.

The method 200 begins in step 202. In step 204, the processor may begin to acquire a plurality of video streams depicting a scene. The plurality of video streams may all depict the same scene, but from a plurality of different viewpoints. The plurality of different viewpoints may also exhibit different viewpoint characteristics (e.g., different degrees or levels of zoom, movement, color, lighting, depth of field, and the like). The scene may comprise, for example, a movie or television set, a sports venue, or another location. In one example, the video streams are acquired from a database which stores a plurality of pre-recorded video streams. In this example, the volumetric video presentation may comprise pre-recorded media. However, in another example, the video streams are acquired directly from the cameras that record the video streams. In this example, the volumetric video presentation may comprise a live event (e.g., a sporting event, a concert, or the like). Also in this example, the plurality of video streams may be acquired in real time (i.e., as the cameras capture the video streams and as a live event is occurring, subject to any latency introduced by network conditions).

In step 206, the processor may identify a desired set of viewpoint characteristics for a volumetric video traversal that is to be rendered from the video streams. As discussed above, the desired set of viewpoint characteristics may specify a set of desired stylistic features for the traversal, such as desired degrees or levels of zoom, movement, color, lighting, depth of field, and the like. The desired set of viewpoint characteristics could also be specified more generally, e.g., as a genre, a cinematic style, and/or a director to mimic. For instance, the desired set of viewpoint characteristics could be specified as "romantic comedy," "film noir," or "Tim Burton."

As also discussed above, there are numerous ways in which a desired set of viewpoint characteristics could be identified. For instance, in one example, the desired set of viewpoint characteristics may be identified or selected based on historical viewership information. This historical viewership information may include genres, cinematic styles, or directors which a specific viewer or which a group of viewers (who may share some similarities with the specific viewer, such as age, gender, place of residence, or the like) have viewed in the past, and which may be thematically similar to the scene that is presented in the volumetric video presentation. For instance, if the scene is part of an episode of a television show, and viewers of an age range have shown a preference for viewing traversals that present the television show as a romantic comedy, then a specific viewer whose age falls within that age range may also wish to view traversals that present the television show as a romantic comedy.

In another example, the target may be provided by the viewer. For instance, a specific viewer may send an explicit request to the processor to generate a traversal that presents the scene in the style of a specific genre. As an example, if the scene is a part of a movie, the specific viewer may send a request to the processor that asks for a traversal presenting the movie in the style of an action movie. Alternatively, the specific viewer may be associated with a stored profile that is accessible to the processor. The stored profile may indicate the specific viewer's preferences or history with respect to the types of genres, cinematic styles, and/or directors in which the specific viewer is interested. For instance, if the specific viewer viewed a volumetric video traversal of a movie that presented the movie in an action movie style, the specific viewer may wish to view a volumetric video traversal of a sequel to the movie in the same action movie style.

In another example, the desired set of viewpoint characteristics may be identified from a list of previous viewer-requested viewpoint characteristics. For instance, the scene may comprise an episode of a television show. In a previous episode of the television show, a number of traversals based on viewer-requested targets may have been generated and made available for viewing by any interested viewers. In this case, the viewpoint characteristics of the traversal that was most popular (e.g., most watched, most shared, most liked) may be automatically selected as the desired set of viewpoint characteristics in a new episode of the television show.

In another example still, the desired set of viewpoint characteristics may be requested by a creator of or by another entity involved in the production of the media that comprises the volumetric video traversal. For instance, if the scene is a part of a video game, the creator or publisher of the video game may request the traversals presenting the contents of the video game in specific styles.

In another example, the desired set of viewpoint characteristics may be learned through viewer feedback received in connection with previously rendered volumetric video traversals. The viewer feedback may be explicit (e.g., the viewer may like, share, recommend, bookmark, review, or rate a traversal or a portion of a traversal) or implicit (e.g., the viewer may fast forward through portions of a traversal).

In step 208, the processor may determine a trajectory through the plurality of video streams that is consistent with the desired set of viewpoint characteristics. For instance, the processor may analyze the plurality of video streams for viewpoint characteristics that match the desired set of viewpoint characteristics. The desired set of viewpoint characteristics may be identified in the video streams using object, facial, text/character, or other recognition techniques. If the processor is unable to find video streams that exactly match the desired set of viewpoint characteristics, the processor may search for video streams that match the desired set of viewpoint characteristics within some threshold (e.g., within x percent of a defined maximum centimeter per second camera movement, within y candelas of a defined minimum candelas lighting, etc.). For instance, if a video stream's viewpoint characteristics are within some threshold of the desired set of viewpoint characteristics, it may be possible to edit the video stream so that the video stream's viewpoint characteristics better match the desired set of viewpoint characteristics.

In one example, determination of the trajectory may also involve tracking a predefined target (e.g., an individual, an object, or a location) through the plurality of video streams. The target may be defined in addition to the desired set of viewpoint characteristics, or the tracking of the target may be determined to be part of the desired set of viewpoint characteristics (e.g., if the traversal is to present the scene in an action movie style, then part of mimicking the action movie style may involve tracking specific actors or vehicles).

In step 210, the processor may composite the plurality of video streams to render a volumetric video traversal that presents the scene in a manner that is consistent with the desired set of viewpoint characteristics (e.g., that follows the trajectory determined in step 208). For instance, the processor may employ a mesh-based technique (e.g., in which a static three dimensional mesh representation of a scene may be generated and subsequently enhanced with computer generated techniques), a point-based technique (e.g., in which image data captured by the cameras may be represented as points in a three-dimensional space), a combination of mesh-based and point-based techniques, or other techniques used to produce volumetric video to render the traversal.

In one example, compositing of the plurality of video streams may also involve identification of potential locations for advertising or other materials. For instance, inclusion of video streams displaying a certain depth of field or zooming in on certain objects may provide opportunities for product placements. In another example, video streams may be selected for compositing that present the scene in a manner consistent with the desired set of viewpoint characteristics, but also omit any subject matter that the viewer does not want to see (e.g., subject matter that the viewer wishes to be filtered out). For instance, a first video stream may depict a zoomed-in view of a scene that focuses directly on an actor, while a second video stream may depict a zoomed-out view of the same scene that focuses less directly on the actor. If the zoomed-out view depicts subject matter that the viewer has requested be filtered out (e.g., violence), but this subject matter is not visible in the first video stream, then the first video stream may be selected for compositing.

In one example, the traversal may be rendered in multiple formats, including two-dimensional and three-dimensional formats. This may allow user endpoint devices that are not capable of displaying video in three dimensions or in 360 degrees to still display viewer-oriented viewpoints.

In step 212, the processor may publish the traversal for viewing on user endpoint devices. For instance, the processor may publish a list or menu of available traversals of the scene, where a viewer may interact with the list or menu and select any of the published traversals for viewing. In one example, the user may store a number of alternate traversals as a single "playlist." These playlists could be published as alternative narratives for the same content (e.g., producing a "director's cut" playlist, a "behind the scenes" playlist, an "apprentice training" playlist, or even a summarized "trailer" playlist, among others). Playlists of alternate traversals may be published independently or as a group (e.g., as different versions of the original volumetric video renderings). In response to a viewer selection of a traversal, the processor may stream the selected traversal to the viewer's endpoint device. In one example, the traversal can be viewed on an endpoint device as the traversal is being created.

In optional step 214, the processor may receive viewer feedback in response to the traversal. The viewer feedback may be explicitly provided (e.g., via the viewer liking, sharing, or otherwise rating or reviewing the traversal). The viewer feedback may also be implicitly provided (e.g., via the viewer viewing the traversal or not viewing the traversal or jumping to a traversal that follows a different target). In one example, the viewer feedback may include requests for modifications to the traversal (e.g., content to filter out, changes to the lighting, changes to the genre or style, etc.).

In optional step 216 (illustrated in phantom), the processor may store the feedback for reference in rendering future volumetric video traversals. For instance, the feedback may be used to train a machine learning model that is used to identify desired sets of viewpoint characteristics and/or to select video streams for compositing, so that future traversals that are automatically rendered better adhere to a specific viewer's (or to a group of viewers') preferences. For instance, the feedback may help the processor to better learn the viewpoint characteristics that are typical of a specific genre, cinematic style, or director.

The method 200 may end in step 218. The method 200 may be repeated any number of times for any number of scenes, where each scene may comprise a portion of the same volumetric video presentation. In addition, the method 200 may be repeated any number of times for the same scene, so that multiple traversals of the same scene can be rendered, and each traversal may present the scene in a manner consistent with a different set of viewpoint characteristics.

Thus, the method 200 automatically renders volumetric video traversals of scenes that are consistent with viewpoint characteristics that are expected to be of interest to a viewer (or group of viewers). For instance, viewpoint characteristics such as sound, mise-en-scene, cinematography, editing, lighting, focal length, and/or attitude may be selected or adjusted so that a traversal mimics the style of a specific genre (e.g., documentary, film noir, arthouse, etc.), a specific group of filmmakers (e.g., Italian Neorealism, French new Wave, etc.), or a specific director. The viewpoint characteristics associated with different styles, as well as viewer preferences for particular viewpoint characteristics or styles, may be automatically learned. This learning can also be enhanced based on viewer feedback. Ultimately, the ability to create multiple traversals of the same content, where each traversal may mimic a different artistic style, allows for greater viewer personalization. For instance, one viewer may choose to view a film noir style rendering of the content, while another viewer may choose to view a documentary style rendering of the same content.

Further examples of the disclosure may allow the tone of a volumetric video traversal to be mixed, e.g., to blend more than one tone. In one example, tones may be blended according to weightings that indicate the relative importance of the different tones. For instance, a creator of a scene may specify that a traversal of the scene should be rendered that is x percent comedy, y percent action, etc.

Any traversals rendered according to the method 200 may be output as a series of playlists. For instance, when a viewer is about to view a scene, the viewer may be presented with a list of available traversals of the scene, where each traversal may present the scene in a manner that is consistent with a different set of viewpoint characteristics (e.g., different styles, genres, durations, etc.). The viewer may then select which of the available traversals he or she wishes to view. Each traversal could also be rendered in multiple formats (e.g., two- and three-dimensional) and multiple resolutions.

In further examples still, examples of the present disclosure could be used to control cameras to capture video streams that are consistent with a desired set of viewpoint characteristics. For instance, if a desired style tends to capture images of people's faces from a distance of z feet away, then a signal could be sent to a movable camera to adjust its position until the camera is z feet away from a target individual who is present in the scene.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a wearable display device or an application server could be implemented as illustrated in FIG. 3.

As depicted in FIG. 3, the system 300 comprises a hardware processor element 302, a memory 304, a module 305 for automatic selection of viewpoint characteristics and trajectories in volumetric video presentations, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for automatic selection of viewpoint characteristics and trajectories in volumetric video presentations may include circuitry and/or logic for performing special purpose functions relating to streaming volumetric video content. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for automatic selection of viewpoint characteristics and trajectories in volumetric video presentations (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for automatic selection of viewpoint characteristics and trajectories in volumetric video presentations (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
receiving, by a processor, a plurality of video streams depicting a scene, wherein the plurality of video streams provides images of the scene from a plurality of different viewpoints;
identifying, by the processor, a set of desired viewpoint characteristics for a volumetric video traversal of the scene;

determining, by the processor, a trajectory through the plurality of video streams that is consistent with the set of desired viewpoint characteristics;

rendering, by the processor, a volumetric video traversal that follows the trajectory, wherein the rendering comprises compositing the plurality of video streams, and wherein the volumetric video traversal is one of a plurality of volumetric video traversals of the scene, and each volumetric video traversal of the plurality of volumetric video traversals presents the scene in a manner consistent with a different set of viewpoint characteristics; and publishing, by the processor, the volumetric video traversal for viewing on a user endpoint device.

2. The method of claim 1, further comprising:
receiving, by the processor, viewer feedback regarding the volumetric video traversal; and
adjusting, by the processor, rendering of a future volumetric video traversal in response to the viewer feedback.

3. The method of claim 1, wherein the desired set of viewpoint characteristics specifies a desired level of lighting in the scene or a desired level of zoom in the scene.

4. The method of claim 1, wherein the desired set of viewpoint characteristics specifies a desired level of color in the scene.

5. The method of claim 1, wherein the desired set of viewpoint characteristics specifies a desired depth of field in the scene.

6. The method of claim 1, wherein the desired set of viewpoint characteristics specifies a desired level of sound in the scene.

7. The method of claim 1, wherein the desired set of viewpoint characteristics specifies a desired genre that the volumetric video traversal is to mimic.

8. The method of claim 1, wherein the desired set of viewpoint characteristics specifies a desired cinematic style that the volumetric video traversal is to mimic.

9. The method of claim 1, wherein the desired set of viewpoint characteristics specifies a desired director style that the volumetric video traversal is to mimic.

10. The method of claim 1, wherein the identifying comprises:
identifying a preference for the desired set of viewpoint characteristics in a stored profile associated with a viewer of the volumetric video traversal.

11. The method of claim 1, wherein the identifying comprises:
receiving a request from a viewer of the volumetric video traversal that specifies the desired set of viewpoint characteristics.

12. The method of claim 1, wherein the identifying comprises:
identifying a group of viewers who share a similarity with a viewer of the volumetric video traversal; and
selecting a set of viewpoint characteristics for which the group of viewers have previously expressed a preference as the desired set of viewpoint characteristics.

13. The method of claim 1, wherein the identifying comprises:
selecting a set of viewpoint characteristics that was previously of interest to a viewer of the volumetric video traversal in a media that is thematically to the scene as the desired set of viewpoint characteristics.

14. The method of claim 1, wherein the identifying comprises:

receiving a request from a creator of the scene, wherein the request specifies the desired set of viewpoint characteristics.

15. The method of claim 1, wherein the rendering comprises:
selecting a subset of the plurality of video streams that presents the scene in a manner consistent with the desired set of viewpoint characteristics; and
performing the compositing using the subset.

16. The method of claim 15, wherein the desired set of viewpoint characteristics specifies subject matter that a viewer of the volumetric video traversal does not want to see.

17. The method of claim 1, wherein the rendering comprises:
editing a video stream of the plurality of video streams to produce an edited stream that is consistent with the desired set of viewpoint characteristics.

18. A non-transitory computer-readable storage medium storing instructions which, when executed by a processor, cause the processor to perform operations, the operations comprising:
receiving a plurality of video streams depicting a scene, wherein the plurality of video streams provides images of the scene from a plurality of different viewpoints;
identifying a set of desired viewpoint characteristics for a volumetric video traversal of the scene;
determining a trajectory through the plurality of video streams that is consistent with the set of desired viewpoint characteristics;
rendering a volumetric video traversal that follows the trajectory, wherein the rendering comprises compositing the plurality of video streams, and wherein the volumetric video traversal is one of a plurality of volumetric video traversals of the scene, and each volumetric video traversal of the plurality of volumetric video traversals presents the scene in a manner consistent with a different set of viewpoint characteristics; and
publishing the volumetric video traversal for viewing on a user endpoint device.

19. The non-transitory computer-readable storage medium of claim 18, wherein the identifying comprises:
selecting a set of viewpoint characteristics that was previously of interest to a viewer of the volumetric video traversal in a media that is thematically to the scene as the desired set of viewpoint characteristics.

20. A system comprising:
a processor deployed in a telecommunication service provider network; and
a non-transitory computer-readable medium storing instructions which, when executed by the processor, cause the processor to perform operations, the operations comprising:
receiving a plurality of video streams depicting a scene, wherein the plurality of video streams provides images of the scene from a plurality of different viewpoints;
identifying a set of desired viewpoint characteristics for a volumetric video traversal of the scene;
determining a trajectory through the plurality of video streams that is consistent with the set of desired viewpoint characteristics;
rendering a volumetric video traversal that follows the trajectory, wherein the rendering comprises compositing the plurality of video streams, and wherein the volumetric video traversal is one of a plurality of volumetric video traversals of the scene, and each volumetric video traversal of the plurality of volumetric video traversals presents the scene in a manner consistent with a different set of viewpoint characteristics; and publishing the volumetric video traversal for viewing on a user endpoint device.

\* \* \* \* \*